United States Patent [19]
Franck et al.

[11] Patent Number: 6,144,568
[45] Date of Patent: Nov. 7, 2000

[54] CIRCUIT ARRANGEMENT FOR OPERATING ELECTRICAL LAMPS

[75] Inventors: Felix Franck; Theodor Kiermeier, both of Munich, Germany

[73] Assignee: Patent-Treuhand-Gesellschaft fuer elektrische Gluehlampen mbH, Munich, Germany

[21] Appl. No.: 09/310,422

[22] Filed: May 12, 1999

[30] Foreign Application Priority Data

May 13, 1998 [DE] Germany ............ 198 21 351

[51] Int. Cl.[7] .............. H02M 1/12; H02M 1/14
[52] U.S. Cl. .............. 363/39; 363/132; 323/905; 315/224
[58] Field of Search ........... 363/37, 39, 34, 363/124, 132, 89, 98; 315/129, 224; 323/905

[56] References Cited

U.S. PATENT DOCUMENTS

| | | | |
|---|---|---|---|
| 4,438,372 | 3/1984 | Zuchtriegel | 315/224 |
| 4,528,456 | 7/1985 | Harris | 307/31 |
| 4,862,041 | 8/1989 | Hirschmann | 315/246 |
| 4,949,013 | 8/1990 | Zuchtriegel | 315/106 |
| 4,954,768 | 9/1990 | Luchaco et al. | 323/300 |
| 5,327,047 | 7/1994 | Gershen | 315/194 |
| 5,394,062 | 2/1995 | Minarczyk et al. | 315/129 |
| 5,740,021 | 4/1998 | Lecheler et al. | 363/37 |

FOREIGN PATENT DOCUMENTS

| | | |
|---|---|---|
| 0647084B1 | 8/1994 | European Pat. Off. . |
| 0682464A1 | 5/1995 | European Pat. Off. . |
| 0682465A1 | 5/1995 | European Pat. Off. . |
| 4011742C2 | 10/1991 | Germany . |

OTHER PUBLICATIONS

Douglas Thom, "Capacitor drops voltage with little heat for low cost, low voltage power supply", Electronic Design, p. 148, Nov. 1975.

Hirschmann, Hauenstein, Schaltnetzteile, Siemens AG, 1990, p. 102.

H.–J. Mayer, Stromversorgungen fuer die Praxis, Vogel Buchverlag, Wurzburg, 1989, p. 115–116.

*Primary Examiner*—Peter S. Wong
*Assistant Examiner*—Bao Q. Vu
*Attorney, Agent, or Firm*—Carlo S. Bessone

[57] ABSTRACT

The invention relates to a circuit arrangement for operating electrical lamps which encompasses an invertor (WR) with oscillation build-up circuit (trigger generator), comprising diac (DC1) and drive circuit. The drive circuit comprises a high-pass filter, in particular an RC high-pass filter (R1, C1). As a result, the trigger initiation is shifted closer to the zero crossing of the supply voltage. This means, in turn, that a more sinusoidal power supply current consumption with a smaller proportion of harmonics is obtained. In addition, more stable lamp operation is achieved in combination with power supply segment control dimmers.

11 Claims, 4 Drawing Sheets

CIRCUIT ARRANGEMENT FOR OPERATING ELECTRICAL LAMPS

BACKGROUND OF THE INVENTION

The invention relates to a circuit arrangement for operating electrical lamps. This type of circuit arrangement is used, in particular, for operating low-voltage incandescent halogen lamps, on the one hand, and discharge lamps, for example fluorescent lamps, on the other hand, from an AC voltage power supply or a DC voltage source. Circuit arrangements of this type are generally called "electronic ballasts" (EBs) for the operation of discharge lamps, while the designation "electronic transformer" or "electronic converter" is customary for the operation of low-voltage incandescent halogen lamps.

An essential component is a self-excited invertor with current feedback, for example in a half-bridge or full-bridge circuit, which invertor chops the low-frequency power supply voltage or the DC voltage—which may also be pulsating—into a high-frequency voltage. The latter is adapted to the electrical requirements of the lamp(s) to be operated by means of a coupling circuit tuned to the type of lamp.

In order to operate low-voltage incandescent halogen lamps, the coupling circuit essentially comprises a power transformer which transforms the high-frequency voltage to the low voltage of the incandescent halogen lamps to be used, e.g. 6, 12 or 24 V. Therefore, such circuit arrangements are also referred to as electronic converters. Their detailed method of operation is disclosed for example in EP-V 264 765 and DE-A 40 11 742.

In order to operate discharge lamps, for example fluorescent lamps, the bridge transistors are followed by a ballast inductor which limits the lamp current. In order to ignite the discharge, the coupling circuit may also comprise a capacitor which is connected in parallel with the electrodes of the discharge lamp and is operated in resonance with the ballast inductor. The method of operation of such electronic ballasts is explained in more detail for example in DE-C 29 41 822 and DE-A 38 05 510.

In both cases, the invertor is controlled by an output current component that is fed back. As a result, in order to start the oscillation of the invertor for the first time (see e.g. EP 0 682 464 A1), for example immediately after the switching on of the supply voltage, and also in order to restart the oscillation after each zero crossing of the power supply voltage (see e.g. EP 0 682 465 A1 or EP 0 647 084 A1), in particular in electronic converters, a control pulse is necessary to initiate the HF oscillation of the invertor. Electronic converters or ballasts usually contain an oscillation build-up circuit, also called a start or trigger generator, which performs this task.

In the simplest case, the trigger generator essentially comprises a charging capacitor, a charging resistor and a voltage-dependent switching element, for example a diac. The charging capacitor is initially charged via a charging resistor. When the voltage of the charging capacitor reaches the threshold value of the voltage-dependent switching element—the triggering voltage of the diac in the example—the switching element turns on and the high-frequency oscillation of the invertor starts. During operation of the invertor, on the other hand, it is necessary to prevent the generation of a trigger signal that interferes with the high-frequency oscillation through the voltage-dependent switching element.

PRIOR ART

EP 0 682 464 A1 discloses a circuit arrangement for operating electrical lamps with an invertor and a trigger generator. The trigger generator comprises a resistor, a charging capacitor, a diac and a controllable discharge resistor. The controllable discharge resistor prevents the production of trigger pulses while the half-bridge oscillates.

The charging capacitor of the trigger generator is charged via the serially connected resistor. The controllable discharge resistor is realized by an NPN transistor, for example. Its collector-emitter path is connected in parallel with the charging capacitor. In one exemplary embodiment, this collector-emitter path is turned on, i.e. acquires a low impedance, in synchronism with the collector-emitter path of a bridge transistor of the invertor, with the result that the charging capacitor can be discharged via the collector-emitter path of the discharge transistor. As a result, an undesirable trigger pulse is reliably prevented from being superposed on the control voltage for the bridge transistor in a simple manner.

What is disadvantageous about this kind of trigger pulse generation is the fact that the signal which drives the diac reacts relatively slowly to changes in the supply voltage, for example in the course of switching on or reswitching on after a malfunction of the circuit arrangement. Particularly with a pulsed supply voltage, as is supplied, if appropriate, by bridge rectifiers in the input of circuit arrangements of this type, rapid triggering is indispensable for a power supply current consumption which is as sinusoidal as possible, i.e. having a minimum proportion of harmonics. The maximum permissible proportion of harmonics is regulated by corresponding standards (IEC 1000-3-2).

A further problem may arise when so-called phase gating and chopping dimmers are used. In this case, a so-called flicker effect can occur under certain circumstances. The lamp operated from the output of the circuit arrangement is alight with temporal interruptions such that the human eye perceives the noncontinuous light emission in a disturbing manner.

The main reason for the abovementioned problems may be seen in the response of the circuitry that drives the diac. Specifically, the circuitry in EP 0 682 464 A1 is an RC low-pass filter which transfers a signal change at its input to its output with a delay. As a result, a step function at the input, for example, is transferred to the output in a manner such that it is "degraded" to a greater or lesser extent.

SUMMARY OF THE INVENTION

The object of the present invention is to provide a circuit arrangement for operating electrical lamps with an improved trigger generator.

The invention proposes using a high-pass filter as drive circuit for the voltage-controlled switching element of the trigger generator. By means of the high-pass filter, a change at the input of the drive circuit is transferred ideally immediately, i.e. without delay, to the output of the drive circuit and consequently to the switching element. When the trigger threshold is reached, finally, the switching element applies a trigger signal to the invertor, whereupon the latter starts to build up oscillations or build up oscillations again.

A series of advantages are achieved by this measure. For the case where the supply voltage is a sinusoidal AC voltage or pulsating DC voltage, the circuit according to the invention causes the initiation of the respective trigger signal to be shifted closer to each zero crossing or zero value of the supply voltage. As a result, a more sinusoidal power supply current consumption than in the prior art is obtained during power supply operation. Furthermore, in combination with a phase gating dimmer, stable, flicker-free lamp operation is ensured even in the dimming mode with small power consumptions, since the trigger pulses follow the abrupt voltage rises of the phase gating dimmers virtually without any delay. The resulting advantage for phase chopping dimmers is that a smaller lower limit of the setting of the dimming mode can be achieved in comparison with the prior art.

BRIEF DESCRIPTION OF THE DRAWINGS

The invention will be explained in more detail below using a number of exemplary embodiments. In the figures.

BEST MODE FOR CARRYING OUT THE INVENTION

In order to elucidate the invention further, reference is made below to FIG. 1, which shows a circuit arrangement according to the invention with an invertor WR and a load La connected thereto, and also with a particularly simple design of the high-pass filter circuit in a schematic basic illustration. In this case, the high-pass filter circuit comprises a capacitor C1 connected serially between the voltage-dependent switching element, in this case a diac DC1, and the live input terminal E1 of the circuit arrangement. In other words, the input terminal W of the high-pass filter circuit is connected to the live input terminal E1 of the circuit arrangement, and the output terminal V of the high-pass filter circuit is connected to the voltage-dependent switching element. In principle, the input terminal W of the high-pass filter circuit may also be connected to another potential which is suitable for triggering and has principally unambiguous edges in the positive direction. The second input terminal E2 of the circuit arrangement in this case defines the reference-ground potential. The capacitor C1 acts as a driver capacitor which transfers the changes in the potential at the input W of this purely differentiating element directly to the voltage-dependent switching element DC1.

A further advantage that may be emphasized—in addition to the rapid trigger initiation—is the minimal number of components, specifically just a single one, for the drive circuit for the voltage-dependent switching element.

This is because, in contrast to the prior art (not illustrated), in this case there is no charging capacitor C which must first be charged via a charging resistor R and reach the threshold value for the triggering of the diac with the time constant $\tau = R \cdot C$. As a result, the disadvantageous effect of delayed trigger initiation as explained above in the context of the prior art is avoided in the case of the circuit according to the invention.

Figure 1:
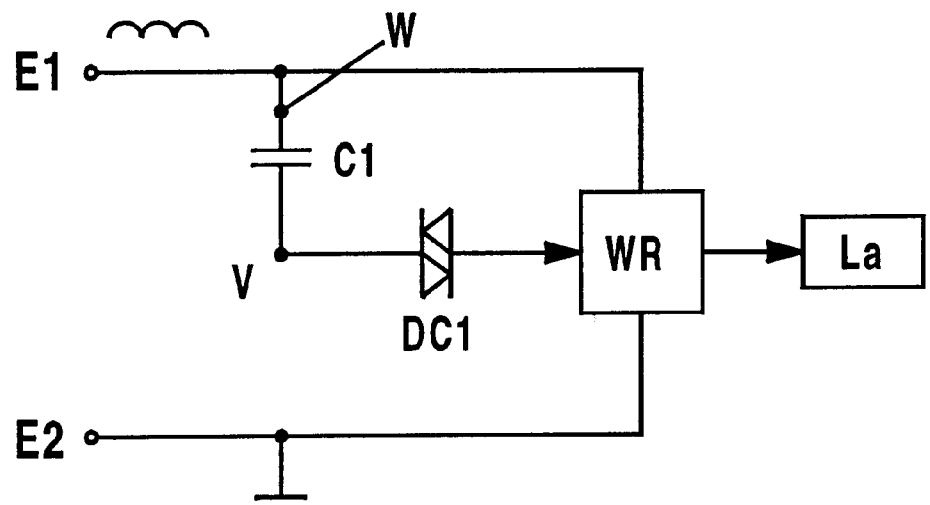
FIG. 1 shows a basic circuit diagram of the circuit arrangement according to the invention with a trigger generator having a particularly simple structure.
Figure 2:
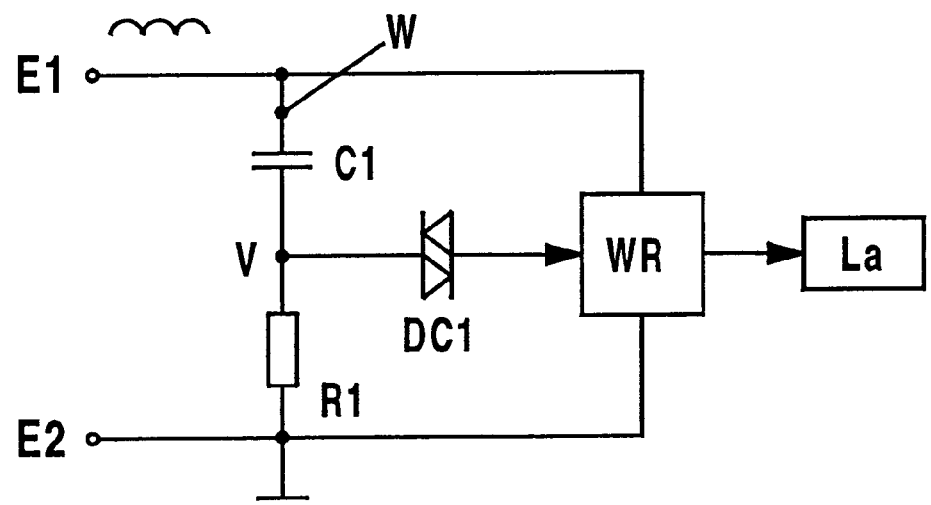
FIG. 2 shows a variant with respect to FIG. 1.

In one variant (see FIG. 2), the drive circuit from FIG. 1 is supplemented to form an RC high-pass filter. For this purpose, a resistor R1 is connected to the junction point between capacitor C1 and diac DC1, on the one hand, and the reference-ground potential E2 of the circuit, on the other hand. In this case, then, the output V of the high-pass filter circuit is formed by the junction point between capacitor C1 and resistor R1. The resistor R1 offers a further degree of freedom for influencing the level and the shape of the voltage profile at the junction point V and hence the switching behavior of the diac DC1. Furthermore, this variant is suitable for repeated triggering, since the initial charge in the capacitor C1 is reestablished each time via the resistor R1 and the invertor as long as the invertor operates.

The capacitance of the capacitor C1 of the high-pass filter circuit typically lies in the range from approximately 2.2 nF to 22 nF.

Figure 3:
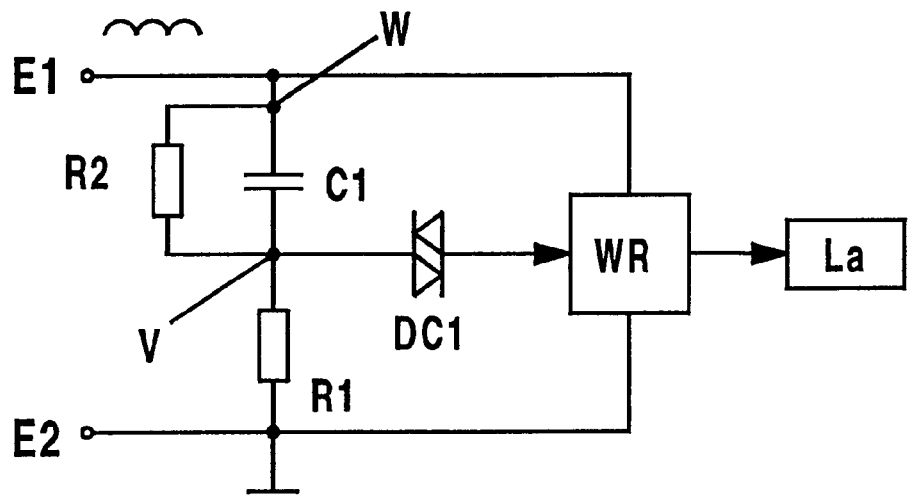
FIG. 3 shows a further variant with respect to FIG. 1.

In a further variant (see FIG. 3), at least one further resistor R2 is connected in parallel with the capacitor C1, i.e. the resistor R2 is connected, on the one hand, to a first terminal of the capacitor C1 at the input terminal W of the high-pass filter circuit and, on the other hand, to the second terminal of the capacitor C1 at the junction point V—the output terminal of the high-pass filter circuit. For practical considerations, it may also be expedient to connect two or even more resistors in parallel with the capacitor C1 in order to divide the voltage between more than one resistor and hence to increase the voltage endurance of the circuitry. The at least one further resistor R2 acts, together with the first resistor, as a resistive voltage divider connected in parallel with the input of the circuit arrangement. The center tap of this voltage divider corresponds to the junction point V, i.e. to the output terminal of the high-pass filter circuit, and in this way drives the diac as well.

As a result, it is possible also to utilize low-frequency voltage components or DC voltage components of the input voltage in the driving of the voltage-dependent switching element (diac DC1). A further aspect is that the resistive conductivity of the circuit arrangement is maintained even when the invertor is not oscillating. This is important particularly In combination with phase chopping dimmers, in order to ensure the inherent supply thereof.

A further advantage is that undervoltage identification is also realized, at the same time, by means of the resistive voltage divider. Specifically, in order that the invertor can be started in the first place, the input voltage of the drive circuit, i.e. the voltage between the input terminal W of the high-pass filter and the reference-ground potential, must be greater than the trigger threshold of the diac DC1 multiplied by the duty ratio of the resistive voltage divider. This property is very important for the operation of the circuit arrangement on phase chopping dimmers, since this effectively prevents an uncontrolled restart of the invertor after the chopping of the power supply voltage by the dimmer.

In principle, the first resistor is dispensable in this case, too, if it is possible to dispense with operation with phase chopping dimmers and with prevention of undesired starting in the event of undervoltage.

The ratio of the values of the at least one further resistor to that of the first resistor, that is to say R2 to R1, typically lies in the range from approximately 3 to 7, where R2 denotes, if appropriate, the sum of a plurality of serial resistor elements.

In order to prevent the potential of the junction point V from falling below the reference-ground potential after the triggering of the invertor, as a result of which the next trigger instant would be delayed in an uncontrolled manner, a current valve, for example a diode, may be connected between the junction point V, which connects the capacitor to the voltage-dependent switching element, and the reference-ground potential of the circuit arrangement.

Figure 4:
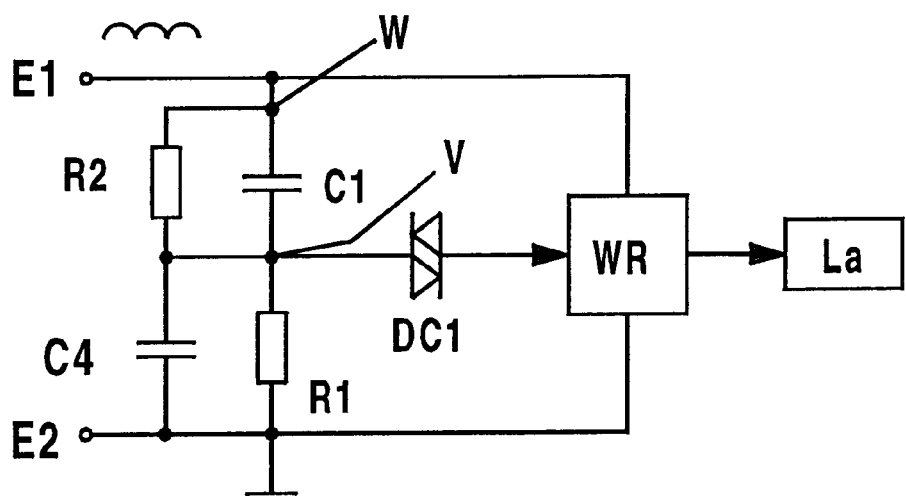
FIG. 4 shows another further variant with respect to FIG. 1.

In a further variant (see FIG. 4), a second capacitor C4 is connected in parallel with the first resistor R1. Said second capacitor is used to attenuate the high-pass filter characteristic for adaptation reasons and also, in particular, to increase the robustness of the circuit arrangement with respect to overvoltage pulses at the supply end. The value $C_4$ of the second capacitor C4 is dimensioned such that the drive circuit retains its high-pass filter characteristic and does not degenerate into an undesirable low-pass filter. In the present case—connection in parallel of a resistive voltage divider (R1, R2) and of a capacitive voltage divider (C1, C4) with a common tap (=junction point V)—this means that the ratio of the capacitance $C_1$ of the first (high-pass filter) capacitor C1 to the sum $C_1+C_4$ of the capacitances of the two capacitors C1, C4, that is to say $C_1/(C_1+C_4)$, is greater than the ratio of the value $R_1$ of the first resistor R1 to the sum $R_1+R_2$ of the resistors R1, R2, that is to say $R_1/(R_1+R_2)$. This is because, as may be shown, the influence of the capacitive component at the tap of the two coupled voltage dividers, i.e. the output V of the drive circuit, is predominant in the event of signal changes at the input W of the drive circuit.

The principle behind the invention as explained above in general terms using an invertor with a connected load can expediently be used both for electronic transformers and for EBs, for which, therefore, protection is expressly claimed in each case.

The circuit arrangement may, in particular for power supply operation, additionally be supplemented by a rectifier circuit. Furthermore, the circuit arrangement may additionally have, in a supplementary fashion, a filter circuit which protects the power supply against high-frequency interference signals of the half-bridge converter in a manner known per se and comprises for example an interference-suppression inductor and one or more capacitors. Finally, the circuit arrangement may also additionally have a protection device affording protection against malfunctions, overload and/or short circuit or the like.

Furthermore, protection is also claimed for a system for operating electrical lamps with the circuit arrangement according to the invention and a dimmer, in particular a phase gating or chopping dimmer, since it is precisely in combination with a dimmer that the specific advantages of the circuit arrangement according to the invention become especially evident.

Figure 5:
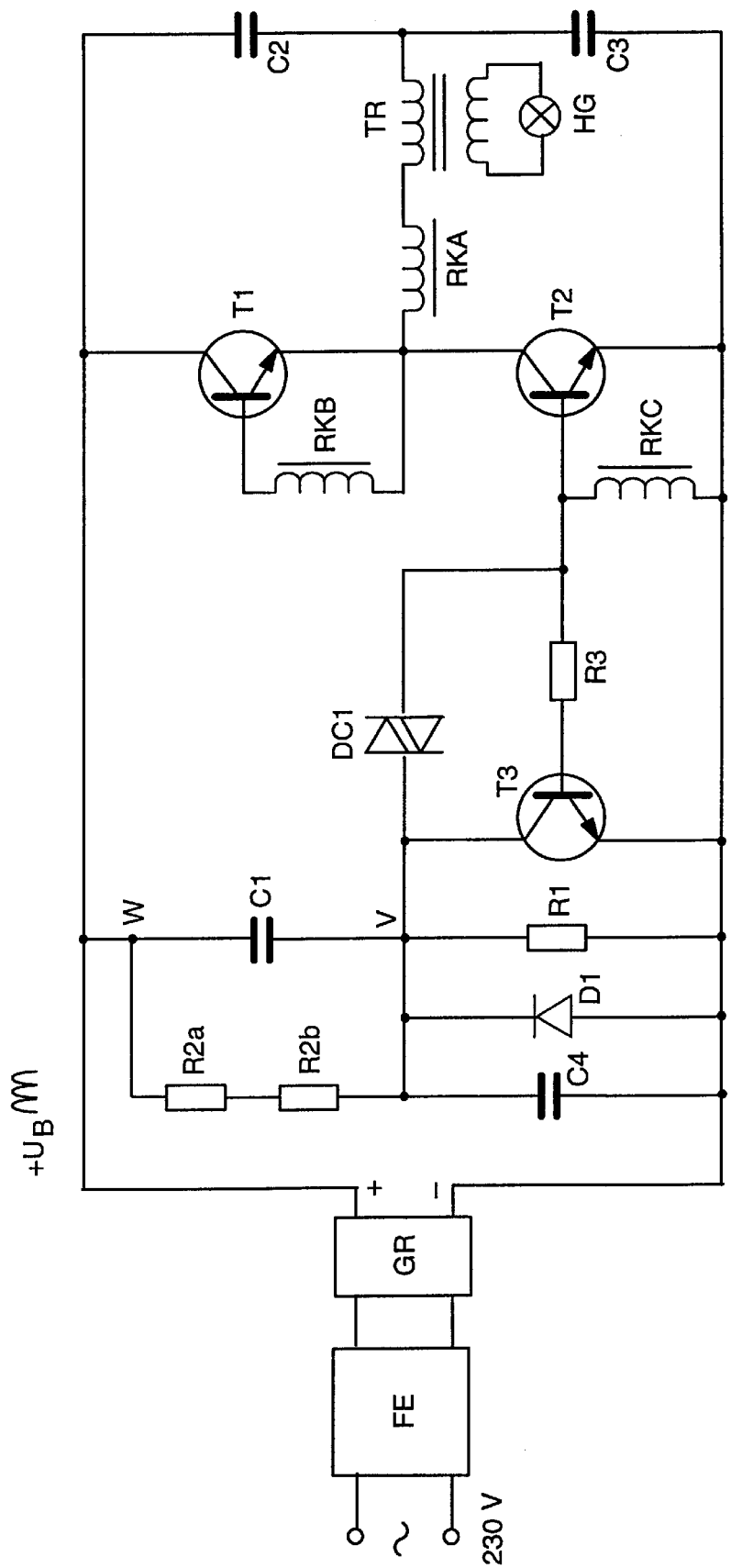
FIG. 5 shows a simplified circuit diagram of an inventive electronic converter for low-voltage incandescent halogen lamps.

FIG. 5 shows a simplified circuit diagram of an electronic converter for low-voltage incandescent halogen lamps. It comprises the function blocks of radio interference suppression FE, rectifier GR, self-excited half-bridge converter with current feedback and trigger generator. The half-bridge converter comprises two half-bridge transistors T1, T2, two half-bridge capacitors C2, C3, a control transformer RKA-RKC for the current feedback and also a power transformer TR. The trigger generator is formed by a diac DC1 and a drive circuit, comprising a first resistor R1 and also a serial pair of resistors R2*a* and R2*b*, a first capacitor C1 and a second capacitor C4 and also a diode D1. An NPN transistor T3 with an associated base series resistor R3 prevents the production of trigger pulses while the half-bridge oscillates.

The method of operation of the circuit arrangement shown in FIG. 5 is explained in more detail below. The radio interference suppression FE protects the power supply against high-frequency interference signals of the half-bridge converter in a manner known per se and comprises for example an interference-suppression inductor and one or more capacitors (see e.g. H.-J. Meyer, "Stromversorgungen für die Praxis (Practical power supplies)", Vogel Buchverlag, Würzburg, 1989, pp. 115–116).

The rectifier GR comprises a diode full-bridge (see e.g. W. Hirschmann and A. Hauenstein, "Schaltnetzteile (Switched-mode power supplies)", Siemens A G, 1990, p. 102) and converts the AC voltage of the power supply into a pulsating DC voltage $+U_B$. The negative pole of the rectifier is the reference-ground potential in the following text.

The two bridge transistors T1, T2 are alternately turned on by the voltage signals of the two secondary windings RKB and RKC, respectively, of the control transformer RKA-RKC. They thus close the electric circuit via the primary windings of control transformer RKA-RKC and power transformer TR, and also via the two bridge capacitors C2 and C3, respectively. The secondary winding of the power transformer TR is connected to a 12 V incandescent halogen lamp.

The first capacitor C1 and the first resistor R1 of the drive circuit are connected in series. The free end of the first capacitor C1 is connected to the pulsating DC voltage $+U_B$ and the free end of the first resistor R1 is connected to the reference-ground potential. The junction point V between first capacitor C1 and first resistor R1 consequently acts as the output of a high-pass filter circuit which drives the diac DC1. For this purpose, the junction point V is connected to the diac DC1. The discharge diode D1 is connected in parallel with the first resistor R1. The serial pair of resistors R2*a*, R2*b* is connected in parallel with the first capacitor C1. The pair of resistors R2*a*, R2*b* acts, together with the first resistor R1, as a resistive voltage divider connected between the pulsating DC voltage $+U_B$ and the reference-ground potential. The center tap of this resistive voltage divider R1 and R2*a*, R2*b* corresponds to the junction point V and, in this way, likewise drives the diac DC1. At the same time, the series circuit of R2*a*, R2*b* and R1 acts as conductance and consequently increases the resistive conductivity of the circuit. This is highly beneficial to the operation of the circuit arrangement on a phase chopping dimmer. In order to attenuate the high-pass filter characteristic for adaptation reasons and, in particular, to increase the robustness of the circuit arrangement with respect to overvoltage pulses at the supply end, the second capacitor C4 is connected in parallel with the first resistor R1.

The collector-emitter path of the discharge transistor T3 is connected in parallel with R1 and D1. Said collector-emitter path is turned on, i.e. acquires a low impedance, in synchronism with the collector-emitter path of the bridge transistor T2—except for a possible slight phase shift due to different switching times of the transistors T2 and T3—, with the result that the second capacitor C4 is discharged via the collector-emitter path of the discharge transistor T3 and, at the same time, the first capacitor C1 can be charged further, with the result that the potential at the junction point V reliably remains below the trigger threshold of the trigger element DC1. For the purpose of synchronization, the base terminals of the two transistors T2, T3 are connected to one another via the series resistor R3, with the result that both the bridge transistor T2 and the discharge transistor T3 are driven by the control voltage of the secondary winding RKC of the control transformer RKA-RKC. As a result, an undesirable trigger pulse is reliably prevented from being superposed on the control voltage for the bridge transistor T2 in a simple manner. The resistor R3 is used, on the one hand, to protect the transistor T3 against overloading. On the other hand, as a result of its dimensioning, the trigger parallel current via the collector-emitter path of the transistor T3 is limited in a targeted manner such that sufficient initial triggering of the half-bridge converter is ensured via the actual trigger path, comprising the diac DC1 and the base-emitter junction of the half-bridge transistor T2. As desired, this means that a trigger signal is generated only when the HF oscillation Of the half-bridge terminates, for example as a result of the power supply voltage being switched off—if appropriate also only temporarily.

A list of components for a concrete exemplary embodiment is specified in the Table.

The following critical values for the action of the drive circuit from FIG. 5 as a high-pass filter result from the list of components:

$$\frac{C_1}{C_1 + C_4} = \frac{8.2 \text{ nF}}{18.2 \text{ nF}} \approx 0.45$$

and $$\frac{R_1}{R_1 + R_{2a} + R_{2b}} = \frac{100 \text{ k}\Omega}{460 \text{ k}\Omega} \approx 0.217$$

It is evident from this that the relationship $$\frac{C_1}{C_1 + C_4} > \frac{R_1}{R_1 + R_{2a} + R_{2b}}$$

introduced in the general part of the description is fulfilled in this case and, consequently, the drive circuit from FIG. 5 acts as a high-pass filter as desired.

Figure 6:
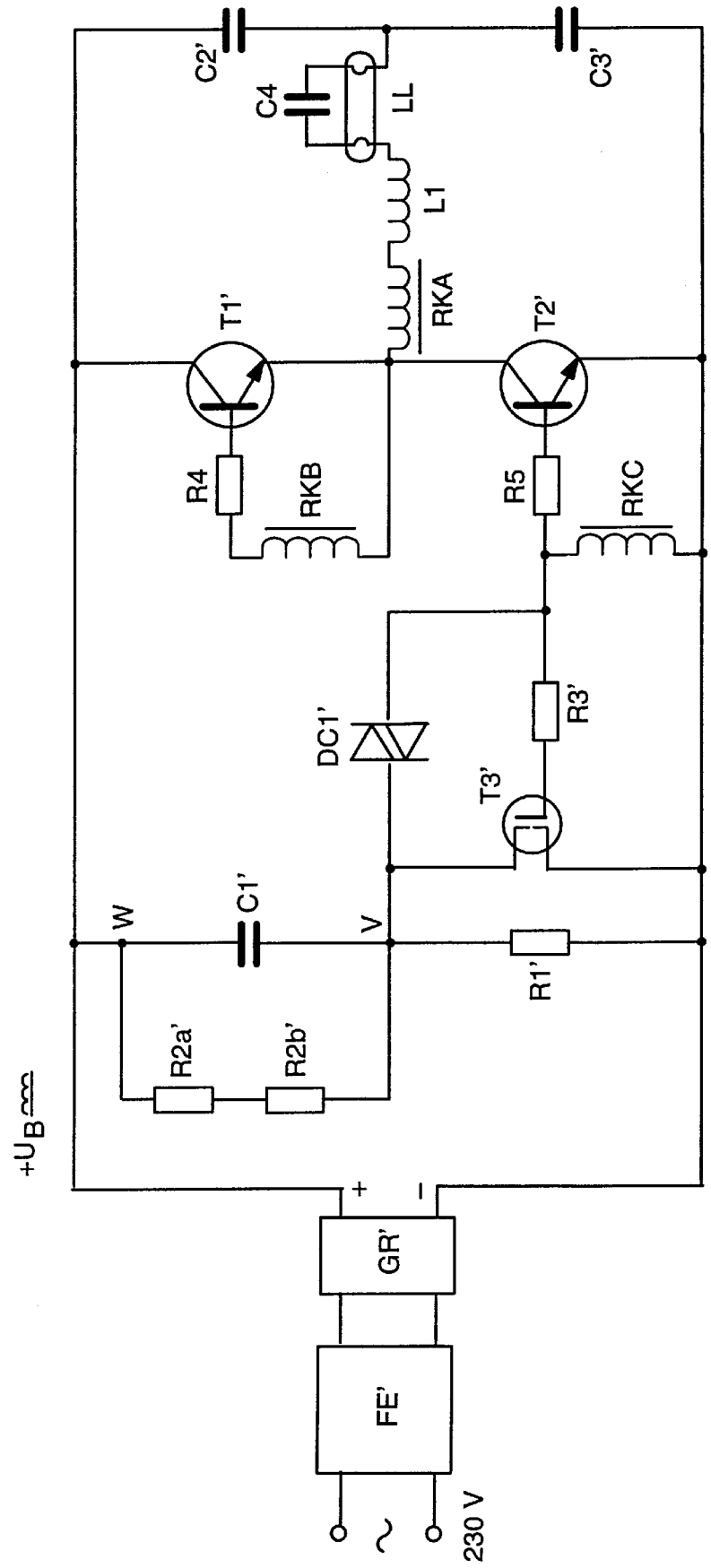
FIG. 6 shows a simplified circuit diagram of an inventive electronic ballast for fluorescent lamps.

FIG. 6 shows a simplified circuit diagram of an inventive electronic ballast for fluorescent lamps. The filter circuit FE' corresponds, in principle, to the filter circuit FE described in FIG. 1. The rectifier GR' contains a smoothing capacitor in addition to a diode full-bridge. Said smoothing capacitor limits the degree of modulation of the rectified supply voltage (modulation frequency 100 Hz) to a value which does not cause any interfering modulation of the light intensity of the fluorescent lamp LL.

The invertor—which in this case comprises a current feedback half-bridge with the two bridge capacitors T1' and T2', the two bridge capacitors C2' and C3' and the control transformer RKA'-RKC'—and also the trigger generator, comprising R1', R2a', R2b', C1' and DC1', correspond, in terms of their fundamental methods of operation, to those already described in FIG. 5. The second capacitor of the drive circuit for the diac DC1' is dispensed with here, in contrast to FIG. 5.

Furthermore, in contrast to FIG. 5, the discharge diode of the trigger generator is dispensed with. This is because said discharge diode is dispensable owing to the smoothing capacitor in the rectifier GR'. The smoothing capacitor prevents the potential at the junction point V from falling below the reference-ground potential.

The two secondary windings RKB', RKC' of the control transformer RKA'-RKC' are connected to the base terminals of the two bridge transistors T1' and T2', respectively, via the series resistors R4 and R5. The controllable discharge resistor is in this case realized by the FET T3'. The latter is a normally off, enhancement-mode n channel MOS-FET. It is connected in a manner corresponding to the NPN transistor T3 in FIG. 4 and is likewise driven essentially in synchronism with the bridge transistor T2' by the control signal of the secondary winding RKC' of the control transformer RKA'-RKC' via the series resistor R2'. The inductor L1 stabilizes the current of the fluorescent lamp LL. Said inductor forms a resonant circuit with the capacitor C4. The dimensioning of said resonant circuit is chosen such that it has a high quality factor during the ignition phase and its resonant frequency is near the operating frequency of the invertor. The high ignition voltages necessary for igniting the fluorescent lamp LL are achieved as a result of this.

The invention is not limited by the embodiments specified. In particular, individual features illustrated in the figures may also be essential to the invention in other combinations.

TABLE

List of components for an exemplary embodiment in accordance with the simplified circuit diagram from FIG. 5.

| | |
|---|---|
| R1 | 100 kΩ |
| R2a + R2b | 360 kΩ |
| R3 | 1 kΩ |
| C1 | 8.2 nF; 400 V |
| C2, C3 | 15 nF; 400 V |
| C4 | 10 nF; 63 V |
| D1 | 1N4148 |
| DC1 | Diac 32 V |
| RKA-RKC | R 10/6/4; 5:5:1 turns |
| TR | EF 25/7.5; 63:7 turns |
| T1, T2 | BUL38D |
| T3 | BC850C |
| HG | Incandescent halogen lamp 12 V, 50 W |

What is claimed is:

1. A circuit arrangement for operating electrical lamps with
   a free-running invertor (WR) with current feedback in a half- or full-bridge circuit,
   a coupling circuit, which is connected to the invertor (WR) and adapts a high-frequency voltage of the invertor to electrical lamp(s) (La; HG; LL) to be operated,
   a trigger generator connected to the invertor (WR), with
      a voltage-dependent switching element (DC1; DC1'),
      a drive circuit for the voltage-dependent switching element (DC1; DC1'), an output terminal (V) of the drive circuit being connected to the invertor (WR) via the voltage-dependent switching element (DC1; DC1'), and the voltage-dependent switching element (DC1; DC1') turning on and, in the process, oscillation of the invertor (WR) starting as soon as a potential of the junction point (V) between drive circuit and voltage-dependent switching element (DC1; DC1') exceeds a threshold value,
   wherein the drive circuit essentially comprises a high-pass filter circuit having a capacitor (C1; C1'), and in which an input terminal (W) and the output terminal (V) of the high-pass filter circuit are formed by a first terminal and a second terminal, respectively, of the capacitor (C1; C1'), the high-pass filter circuit additionally has a first resistor (R1; R1'), which is connected to a junction point (V) between capacitor (C1; C1') and the voltage-dependent switching element (DC1; DC1'), and to a reference-ground potential of the circuit.

2. The circuit arrangement as claimed in claim 1, in which the capacitor (C1; C1') has a capacitance which lies in a range from approximately 2.2 nF to 22 nF.

3. The circuit arrangement as claimed in claim 2, in which the high-pass filter circuit additionally has at least one further resistor (R2a; R2b), which at least one further resistor (R2a; R2b) is connected in parallel with the capacitor (C1; C1').

4. The circuit arrangement as claimed in claim 3, in which a ratio of values of the at least one further resistor (R2a; R2b) to the first resistor (R1) lies in a range from approximately 3 to 7.

5. The circuit arrangement as claimed in claim 1, in which the high-pass filter circuit additionally has a second capacitor (C4), which is connected to the junction point (V) between first capacitor (C1) and voltage-dependent switching element (DC1), and to the reference-ground potential of the circuit, and in which the potential at the output terminal (V) follows a high-pass filter characteristic with respect to the input terminal (W) of the drive circuit.

6. The circuit arrangement as claimed in claim 3, in which a ratio of capacitance C1 of the first capacitor (C1) to a sum $C_1+C_4$ of capacitances of the first and second capacitor (C1, C4), respectively, is greater than a ratio of a value $R_1$ of the first resistor (R1) to the sum $R_1+R_2$ of values of the first and at least one further resistor (R1, R2a, R2b), respectively, such that the following relationship is fulfilled:

$$\frac{C_1}{C_1+C_4} > \frac{R_1}{R_1+R_2},$$

where, if appropriate, the value $R_2$ designates a sum of serial individual resistors (R2a, R2b).

7. The circuit arrangement as claimed in claim 1, in which a current valve is connected between the junction point (V), which connects the first capacitor (C1) to the voltage-dependent switching element (DC1), and the reference-ground potential of the circuit arrangement in such a way that the potential of the output terminal (V) of the high-pass filter circuit does not fall below the reference-ground potential of the circuit arrangement after the triggering of the invertor.

8. The circuit arrangement as claimed in claim 1, in which the input terminal (W) of the drive circuit is connected to a live potential (E1, $+U_B$) of the invertor or to another potential which is suitable for triggering and has edges in a positive direction.

9. The circuit arrangement as claimed in claim 1, in which the voltage-dependent switching element of the trigger generator is a diac (DC1; DC1'), a silicon bilateral switch (SBS) or a programmable unit transistor (PUT).

10. The circuit arrangement as claimed in claim 1, in which the circuit arrangement is an electronic converter suitable for the operation of low-voltage incandescent halogen lamps, or an electronic ballast suitable for the operation of fluorescent lamps.

11. A system for operating electrical lamps with a phase segment control dimmer and a circuit arrangement as claimed in claim 1.

* * * * *